Dec. 6, 1927.

S. GOODFELLOW

TIE PRESS APPLIANCE

Filed Nov. 1, 1926

1,651,884

INVENTOR
Sumner Goodfellow
PER Tefft and Tefft
ATTORNEYS

Patented Dec. 6, 1927.

1,651,884

UNITED STATES PATENT OFFICE.

SUMNER GOODFELLOW, OF BLOOMINGTON, ILLINOIS.

TIE-PRESS APPLIANCE.

Application filed November 1, 1926. Serial No. 145,453.

This invention relates to tie pressers, and more particularly to a tie pressing device utilizing an electrically heated pressing element controlled by a thermal safety member.

One of the objects of the invention is in the provision of a tie presser of simple design adapted to be used in barber shops and the like, as a service element.

Another object is in the provision of a particular tie pressing device including a pressing surface, a pivoted pressing pad fashioned in a manner to contain therein an electrical heating element controlled by a thermal safety element, said pressing pad having attached thereto also a manually operable handle member and a specific arrangement for holding the pressing cloths in a tensioned manner.

Still another object is in the provision of a small tie-pressing unit, readily transferable and adapted to be easily connected to any line circuit, including such electrical safety control mechanism as to prevent overheating.

A further object is in the provision of an aluminum tie pressing unit, including a pressing surface forming a small table, a pressing pad pivoted thereto and fashioned in such manner that a thermally controlled electric heating unit may be contained therein, and a simple arrangement of pressing cloths and tie forms as to permit a quick tie pressing operation.

Other objects will appear in the following specification, taken in connection with the annexed drawings, in which—

Figure 5:
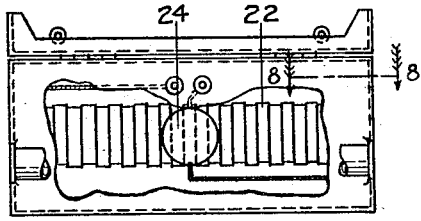
Fig. 5 is a view, with portions broken away, showing the details of the electrical heat unit and thermal safety control means.

Referring specifically to my device, we find an aluminum table or pressing surface 10, the same being elevated by means of the lugs 11. Hinged, as at 12, to the pressing surface 10, we find a pressing pad 13, which is also formed of aluminum and includes the following parts: The pressing pad 13 is made up of an aluminum plate 14 having the upwardly projecting end portions 15 that are adapted to telescope with the cover portion 16 therefor, the same having the downwardly projecting edges 17, with which the before mentioned edges 15 are adapted to telescope. The telescoping of these portions 15 and 17 provides an inner open space 18 in which an electrical heating element, later to be described, is located. Means for holding the portions 14 and 16 in an assembled relationship is provided in the screw members 19.

The cover portion 16 has the upwardly extending arms 20, which are adapted to receive at their open ends a rotatable handle 21.

Figure 8:
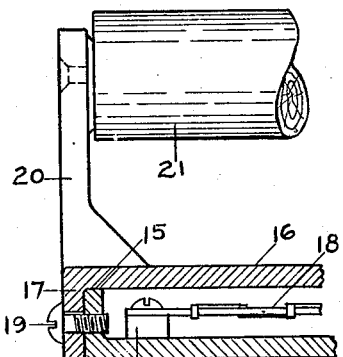
Fig. 8 is an enlarged detail showing the manner of assembling the electrical heat unit with respect to the pressing pad.

With respect to the electrical heating unit, it might be said that this unit is of conventional design and is generally referred to as 22, the same being supported in the manner shown in Fig. 8, wherein the ends of the electrical units are securely attached to insulated plugs 23. As before stated, this electrical heating unit is of conventional design, made up of resistance wires, which in the present instance have been shown as one unit, although it is obvious that plural heating units might well be used to perhaps more evenly distribute the heat to the pressing pad 13.

Included in the electrical circuit of the heating unit is a conventional thermal safety control member 24, which has been shown but generally and is of well known construction, the same being adapted, after a certain temperature has been reached, to open the electrical circuit and prevent overheating of the device.

This control member is absolutely essential to this type of device, which might readily be left for some time by the operator and result in the scorching or burning of the tie to be pressed, were it not for such control.

Figure 3:
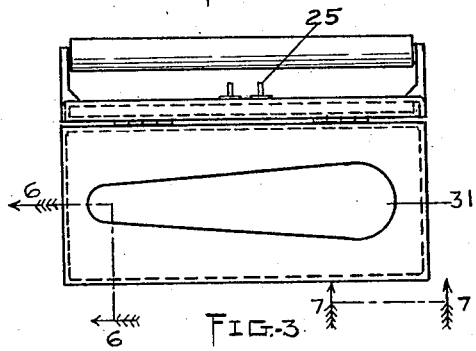
Fig. 3 is a plan view from above, with the pressing pad in a raised position.
Figure 1:
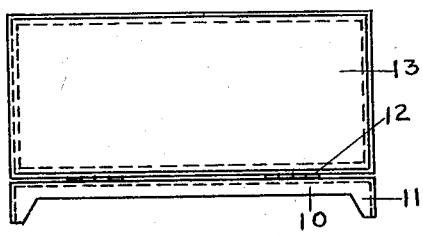
Fig. 1 is a front elevation of the device with the pressing member in a raised position.
Figure 4:
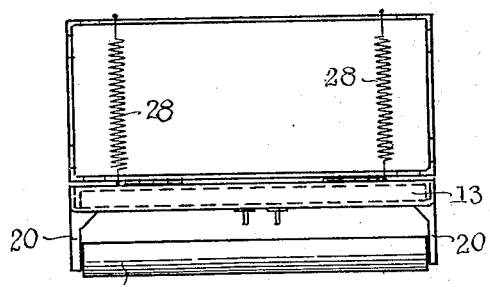
Fig. 4 is a plan view from below, with the pressing pad in raised position.
Figure 6:
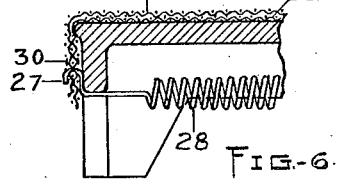
Fig. 6 is an enlarged detail showing the manner of attaching the cloths in a tensioned manner.
Figure 2:
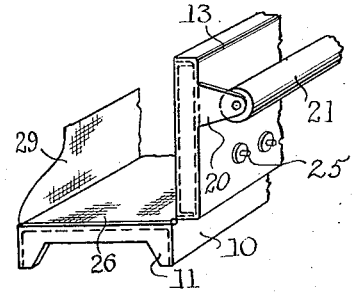
Fig. 2 is a fragmentary perspective view thereof.
Figure 7:
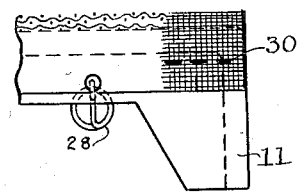
Fig. 7 is another enlarged detail, showing the manner of attaching the pressing cloths.

The means for connecting my service unit to the line wires is shown in the outwardly projecting lugs 25, which are of well known construction and adapted to receive a well known type of electric plug. It is obvious that the pressing operation takes place when the operator, by manually grasping the handle 21, forces the pressing pad 13 against the pressing surface 10. However, it is necessary to place a pressing cloth over the pressing surface 10 and the means for attaching the cloth is as follows:

A pressing cloth 26 is placed over the pressing surface, with the edges extending over the edges of the pressing surface in such manner as to be caught by the hook portions 27 of tension coil springs 28. The above construction provides means for holding the pressing cloth in a tensioned manner upon the pressing surface. A second pressing cloth 29, however, is sewed, as at 30, to the front edge of the cloth 26 and acts as a flap to be folded back over the first mentioned pressing cloth in the manner shown in Fig. 6. In Fig. 3, we find a tie form 31, the same being adapted to be inserted within the folds of the tie to properly press the same. This form 31 may be of different shapes, although the one shown in Fig. 3 is adapted to be inserted in the well known four-in-hand tie.

With respect to the operation of the device, it might be said that the tie form 31 is inserted within the fold of the tie, said form and tie then placed on the pressing surface 10, or rather upon the cloth 26 that overlies such surface, the flap 29 thereafter laid over the tie and form, and the pressing pad manually forced thereupon in the pressing action. It is apparent that after the pressing action has been completed, the tie may be removed, satisfactorily and efficiently pressed and within a very short time.

Obviously, it is not necessary that my service unit be connected at all times with the electrical circuit, and by merely withdrawing the electric plug, not shown, from the contacts 25, the electrical circuit may be broken, just as in a great many well known electrical appliances.

What I claim is:

1. A necktie pressing device comprising a base member and a pressing member hingedly connected to said base member, a pressing pad and pressing cloth overlying the base member and secured thereto, and a second pressing cloth secured to the pad and the first cloth at one of the edges of the base member and of an extent to overlie the base member.

2. A necktie pressing device comprising a base member and a pressing member hingedly connected to said base member, said base member comprising a top portion, stiffening side and end members, and legs, a pressing cloth fastened to the base member by means of springs, and having a flap portion to be folded over a tie lying on the pressing cloth during the pressing operation, said pressing member being in the form of an open top chamber enclosing a heating unit, a cover member fitting in telescopic relation with said pressing member to enclose the chamber and fastened thereto.

3. A necktie pressing device comprising a base member and a pressing member hingedly connected to said base member, said base member comprising a top portion, stiffening side and end members, and legs, a pressing cloth fastened to the base member by means of springs, and having a flap portion to be folded over a tie lying on the pressing cloth during the pressing operation, said pressing member being in the form of an open top chamber enclosing a heating unit, a cover member fitting in telescopic relation with said pressing member to enclose the chamber and fastened thereto, a pair of lugs extending upwardly from the pressing member, and a handle for operating said pressing member fitted between said lugs.

In testimony whereof, I have hereunto affixed my signature.

SUMNER GOODFELLOW.